(12) United States Patent
Bradish et al.

(10) Patent No.: US 8,326,260 B1
(45) Date of Patent: *Dec. 4, 2012

(54) SYSTEM AND METHOD FOR MANAGING COMMUNICATIONS OVER A WIRELESS NETWORK DURING AN EMERGENCY

(75) Inventors: Stillman Bradish, New York, NY (US); Scott A. Smith, Delray Beach, FL (US)

(73) Assignee: Radius Networks, Inc., Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,716

(22) Filed: Nov. 15, 2011

Related U.S. Application Data

(60) Provisional application No. 61/487,549, filed on May 18, 2011, provisional application No. 61/491,431, filed on May 31, 2011, provisional application No. 61/547,271, filed on Oct. 14, 2011.

(51) Int. Cl.
*H04M 11/04* (2006.01)

(52) U.S. Cl. ............... 455/404.1; 455/404.2; 455/414.2; 455/456.1; 709/206

(58) Field of Classification Search ............... 455/404.1, 455/456.1, 404.2, 414.2; 709/206
See application file for complete search history.

(56) References Cited

U.S. PATENT DOCUMENTS

| | | | |
|---|---|---|---|
| 5,873,086 A | 2/1999 | Fujii et al. | |
| 7,305,245 B2 | 12/2007 | Alizadeh-Shabdiz et al. | |
| 7,403,762 B2 | 7/2008 | Morgan et al. | |
| 7,414,988 B2 | 8/2008 | Jones et al. | |
| 7,433,694 B2 | 10/2008 | Morgan et al. | |
| 7,471,954 B2 | 12/2008 | Brachet et al. | |
| 7,474,897 B2 | 1/2009 | Morgan et al. | |
| 7,493,127 B2 | 2/2009 | Morgan et al. | |
| 7,502,620 B2 | 3/2009 | Morgan et al. | |
| 7,515,578 B2 | 4/2009 | Alizadeh-Shabdiz et al. | |
| 7,551,579 B2 | 6/2009 | Alizadeh-Shabdiz et al. | |
| 7,551,929 B2 | 6/2009 | Alizadeh-Shabdiz et al. | |
| 7,610,380 B2 | 10/2009 | Igarashi et al. | |
| 7,768,963 B2 | 8/2010 | Alizadeh-Shabdiz et al. | |
| 7,769,396 B2 | 8/2010 | Alizadeh-Shabdiz et al. | |
| 7,818,017 B2 | 10/2010 | Alizadeh-Shabdiz et al. | |
| 7,835,754 B2 | 11/2010 | Alizadeh-Shabdiz et al. | |
| 7,856,234 B2 | 12/2010 | Alizadeh-Shabdiz et al. | |
| 7,916,661 B2 | 3/2011 | Alizadeh-Shabdiz et al. | |
| 8,000,719 B1 | 8/2011 | Lambert | |
| 8,086,227 B2 | 12/2011 | Adya et al. | |

(Continued)

OTHER PUBLICATIONS

Chandra, Ranveer, et al., "Beacon-Stuffing: Wi-Fi Without Associations." Microsoft Research, 6 pages, Mar. 2007.

*Primary Examiner* — Nghi H Ly
(74) *Attorney, Agent, or Firm* — The Marbury Law Group, PLLC

(57) ABSTRACT

A system and method for managing an emergency over a wireless network. A wireless station receives an emergency information string broadcast by a string broadcast station. The string broadcast station is operated by law enforcement or other authorized personnel. A wireless station obtains the emergency information string and obtains an emergency alert message from a server. The message may be retransmitted by the wireless station. A listener module may be deployed that can be used to identify wireless stations that are within an area affected by the emergency and to provide the emergency alert message to the identified wireless stations.

22 Claims, 11 Drawing Sheets

U.S. PATENT DOCUMENTS

| | | |
|---|---|---|
| 2008/0140509 A1 | 6/2008 | Amjadi |
| 2009/0177759 A1 | 7/2009 | Ogawa et al. |
| 2009/0192871 A1 | 7/2009 | Deacon et al. |
| 2010/0020746 A1 | 1/2010 | Zaks |
| 2010/0063867 A1 | 3/2010 | Proctor, Jr. et al. |
| 2010/0105409 A1* | 4/2010 | Agarwal et al. ............ 455/456.1 |
| 2010/0131567 A1 | 5/2010 | Dorogusker et al. |
| 2010/0175104 A1 | 7/2010 | Khalid |
| 2010/0179872 A1 | 7/2010 | Fujita |
| 2010/0266125 A1 | 10/2010 | Tanaka et al. |
| 2011/0047603 A1 | 2/2011 | Gordon et al. |
| 2011/0059748 A1* | 3/2011 | Taylor et al. ............... 455/456.1 |
| 2011/0178862 A1 | 7/2011 | Daigle |
| 2011/0178863 A1 | 7/2011 | Daigle |

* cited by examiner

SYSTEM AND METHOD FOR MANAGING COMMUNICATIONS OVER A WIRELESS NETWORK DURING AN EMERGENCY

CROSS REFERENCE TO RELATED APPLICATIONS

This application claims priority under 35 U.S.C. §119(e) from provisional application No. 61/487,549 filed May 18, 2011, from provisional application No. 61/491,431 filed May 31, 2011, and from provisional application 61/547,271 filed Oct. 14, 2011. The 61/487,549, the 61/491,431 and the 61/547,271 provisional applications are incorporated by reference herein, in their entireties, for all purposes.

BACKGROUND

Wireless networks are used by consumers, businesses, service organizations (among others) to establish or extend local area networks to locations that are not readily or desirably connected to wire network interface cards.

Networks may be operated so as to restrict access to authorized users. Alternatively, a wireless network may be open to access to anyone, either for a fee or without charge. For example, open networks or "hot spots" are often operated by retail establishments, transportation hubs, medical facilities, and educational institutions to permit access to the Internet to users of wireless stations, such as laptops, smartphones, and tablets, through a base station or access point (AP).

A wireless network typically communicates using a protocol that defines message structures (sometimes referred to herein as "frames"). A message frame may include a field for a network identifier or name, the media access controller address (MAC) of the station from which the frame is broadcast, and other information. In order to connect to a network, a wireless station must first find a compatible network that is within range of its transceiver. This process is typically accomplished through either passive or active scanning. In passive scanning, an AP broadcasts its network name and other information in a message frame. In active scanning, the wireless station requests a response from an access point by broadcasting the network ID of the network it is seeking to join. Alternatively, an active scanning process may include broadcasting a request for a response from any network within range of the wireless station. The APs that are within range broadcast their SSIDs to the wireless station. The wireless station may select a wireless AP to associate with from the list of responders.

Another architecture allows wireless stations to announce their presence to other wireless stations and to form networks in which there is no AP. In this case, the wireless station seeking other wireless stations broadcasts its network identifier and receives a response from other wireless stations within range.

Once a compatible network is found, the wireless station establishes a connection to a wireless network through an exchange of messages that authenticates the wireless station to an access point (or a wireless station when there is no AP present) and then associates the wireless station with that access point or wireless station. By way of illustration and not by way of limitation, an IEEE 802.11 network (or more commonly, "Wi-Fi" network) provides communications between a Wi-Fi AP and Wi-Fi enabled device. The Wi-Fi AP transmits the network name in the form of a service set identifier (SSID). The SSID is typically a 1 to 32 byte value that segments the airwaves for usage. If two wireless networks are physically close, the SSIDs label the respective networks, and allow the components of one network to ignore those of the other. The SSID is present in beacon messages sent by an AP, a probe request sent by a wireless station, probe responses sent by an AP, an association request sent by a probe request sent by a wireless station, and a re-association request sent by a wireless station. When wireless stations are operated without an access device (IBSS or ad-hoc mode), probe requests from one wireless station may be answered by another wireless station with a probe response.

A beacon message is sent by an AP 5 to 20 times per second. The beacon typically includes the SSID, the time, capabilities, supported data rates, and physical layer parameter sets that regulate the smooth operation of a wireless network.

SUMMARY

Embodiments are directed to configuring a string broadcast station (SBS) to transmit a network information string that may be used by wireless stations to initiate an action. As used herein, a string broadcast station encompasses a device that is capable of broadcasting a beacon message that contains a network information string. A "string" encompasses a series of alpha-numeric characters. For example, the network information string may be all or part of a network identifier, for example, the service set identifier (SSID) of a Wi-Fi network. In another embodiment, the network information string may be the MAC address of the SBS that broadcasts the beacon message. The MAC address may be used as the network information string either alone or in combination with the network identifier. A network information string may be registered with an information string server.

The network information string may be used to convey content or a message to another SBS or wireless station. In an embodiment, the network information string and the resulting action are unrelated to the operation of the wireless network.

DETAILED DESCRIPTION

Figure 1:
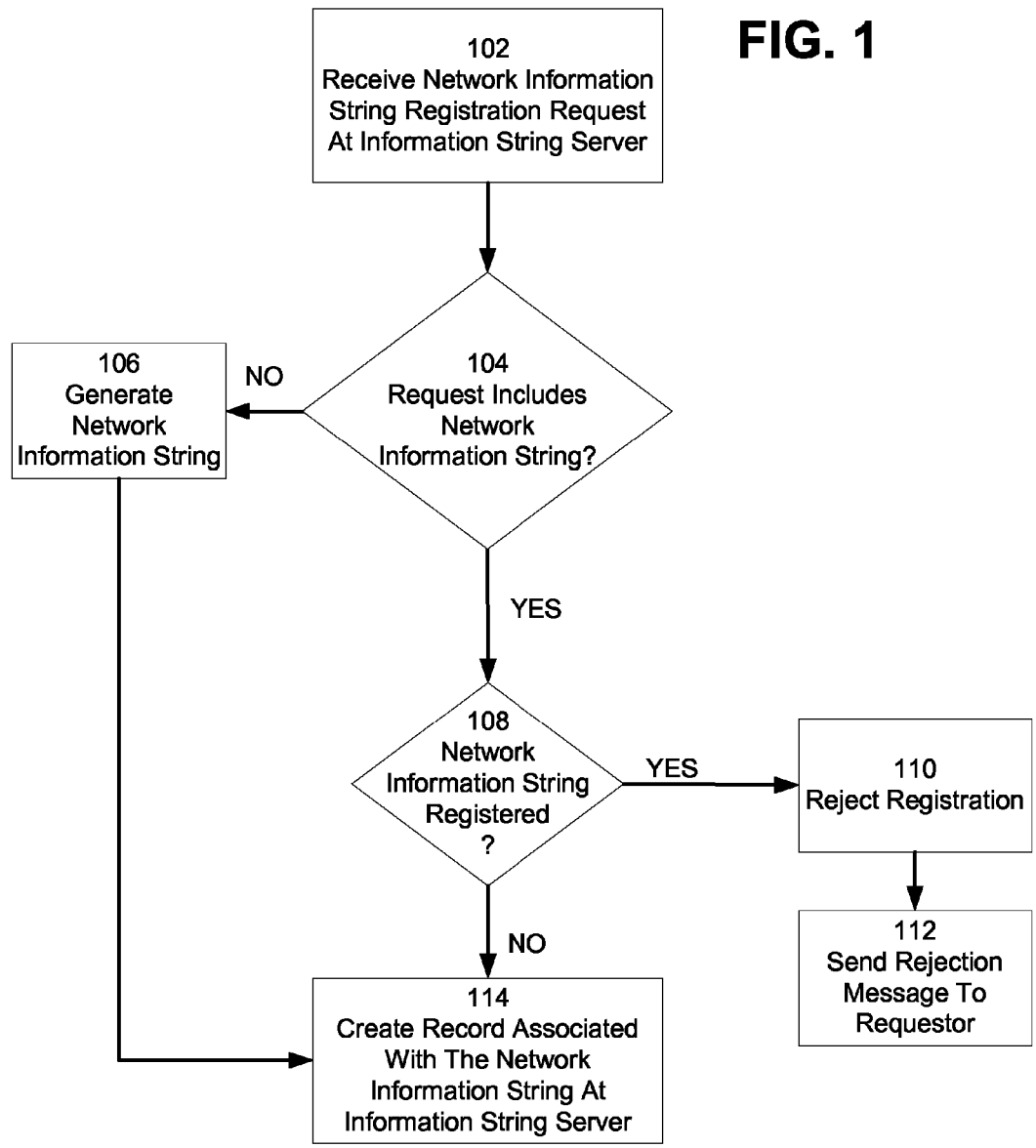
FIG. 1 is a flow diagram illustrating a process by which a network information string may be registered with an information string server according to an embodiment.

Embodiments are directed to utilizing a network information string transmitted by an SBS to convey a string that may be received and used by wireless stations to initiate an action. In an embodiment, the network information string and the resulting action are unrelated to the operation of the wireless network. Embodiments are also directed to associating content with a network identifier of a wireless network, storing the associated content on a server, and providing access to the content to wireless stations based on the network identifier.

Various embodiments are described in the context of a Wi-Fi network. The description is intended to be illustrative only and not limiting. Wireless networks that utilize a network identifier that is broadcast in a message frame (for example and not as a limitation, an 802.11 management frame) either by a string broadcast station or by a wireless station may be used to convey the network information strings and to facilitate the association of content, which may be entirely unrelated to network operation, as described below. For example, wireless networks may include RFID networks, Zigbee networks, Bluetooth networks and 3G/4G networks.

As used herein, a string broadcast station or "SBS" encompasses a device that is capable of broadcasting a beacon message and includes devices that are configured to provide connectivity to a network, not so configured or not capable of providing connectivity to a network.

As used herein, a "beacon message" encompasses a signal transmitted by a base station or an SBS of a wireless network that may be received by a wireless station, which signal conveys a message that identifies the network and provides information about the network, including information to allow a wireless station to join the network.

As used herein, a "probe message" encompasses a signal transmitted by a wireless station that may be received by a wireless station or an SBS, which signal conveys a message that identifies the wireless station and requests information about a particular wireless network or all wireless networks within range of the wireless station.

As used herein, a network information string encompasses a character string that is included in a beacon message broadcast by an SBS or in a probe message broadcast by a wireless station. In an embodiment, the network information string may encompass all or a portion of the network identifier broadcast by the SBS, such as for example and not as limitation, a service set identifier (SSID) of a Wi-Fi network, the MAC address broadcast by the SBS, or the MAC address in combination with all or part of the network identifier.

As used herein, a "server" encompasses a computing device comprising at least one processor that may be configured to interact in an automated fashion with other devices over a network to serve content and web pages, to issue responses to communications from other network devices and to respond to queries from other network devices.

As used herein, a "gateway" encompasses a computing device that may be configured to provide connections between different networks, including connections between a single "outside network" and multiple "inside networks."

Registration of Network Information Strings

FIG. 1 is a flow diagram illustrating a process by which a network information string may be registered with an information string server according to an embodiment.

In an embodiment, a wireless network, such as for example and without limitation a Wi-Fi network, broadcasts a message, such as a beacon message, that includes a network identifier, such as a service set identifier (SSID). All or part of the network identifier may represent a network information string. In this embodiment, a network information string registration request is received at an information string server. (Block 102.) A determination is made whether the request includes a network information string. (Block 104.) If the request does not include a network information string (the determination at Block 104 is "No"), a network information string may be generated by the information string server (Block 106), and the process continues at block 114 (described below).

If the request includes a network information string (the determination at Block 104 is "Yes"), a determination is made whether the requested network information string has been previously registered. (Block 108). In an embodiment, the determination as to whether a network information string has been previously registered may be based on matching all of a previously registered network information string or a portion of the previously registered network information string.

If the network information string has been previously registered (the determination at Block 108 is "Yes"), the registration request is rejected. (Block 110.) A message is sent advising the requestor that the registration request has been rejected. (Block 112.) In an embodiment, the rejection message may include one or more available network information strings. If the network information string has not been previously registered (the determination at Block 108 is "No"), the registration request is granted.

Upon either the generation of a network information string (Block 106) or the granting of a requested network information string (Block 108), a record is created at the information string server associated with the network information string. (Block 114.) The requestor may be required to present credentials to the information string server prior to presenting a request to register the network information string. For example, the requestor may be required to first obtain a user ID and password from the information string server or from an authentication server utilized by the information string server.

As indicated previously, the network information string may include all or a portion of a network name identifier, all or a portion of a MAC address of a string broadcast station that will broadcast the network information string in a beacon message, or a combination of a network name identifier and a string broadcast station MAC address.

In an embodiment, the network information string includes all or part of the network name identifier and may be registered in association with one or more MAC addresses. For example, a single network information string based on the network name identifier may be registered in association with the MAC addresses of multiple string broadcast stations. The string broadcast stations may be used in different locations. As discussed in detail below, the association of the network information string with the string broadcast station MAC address allows information to be associated with a network information string that is specific to that particular SBS.

Content Storage

Figure 2:
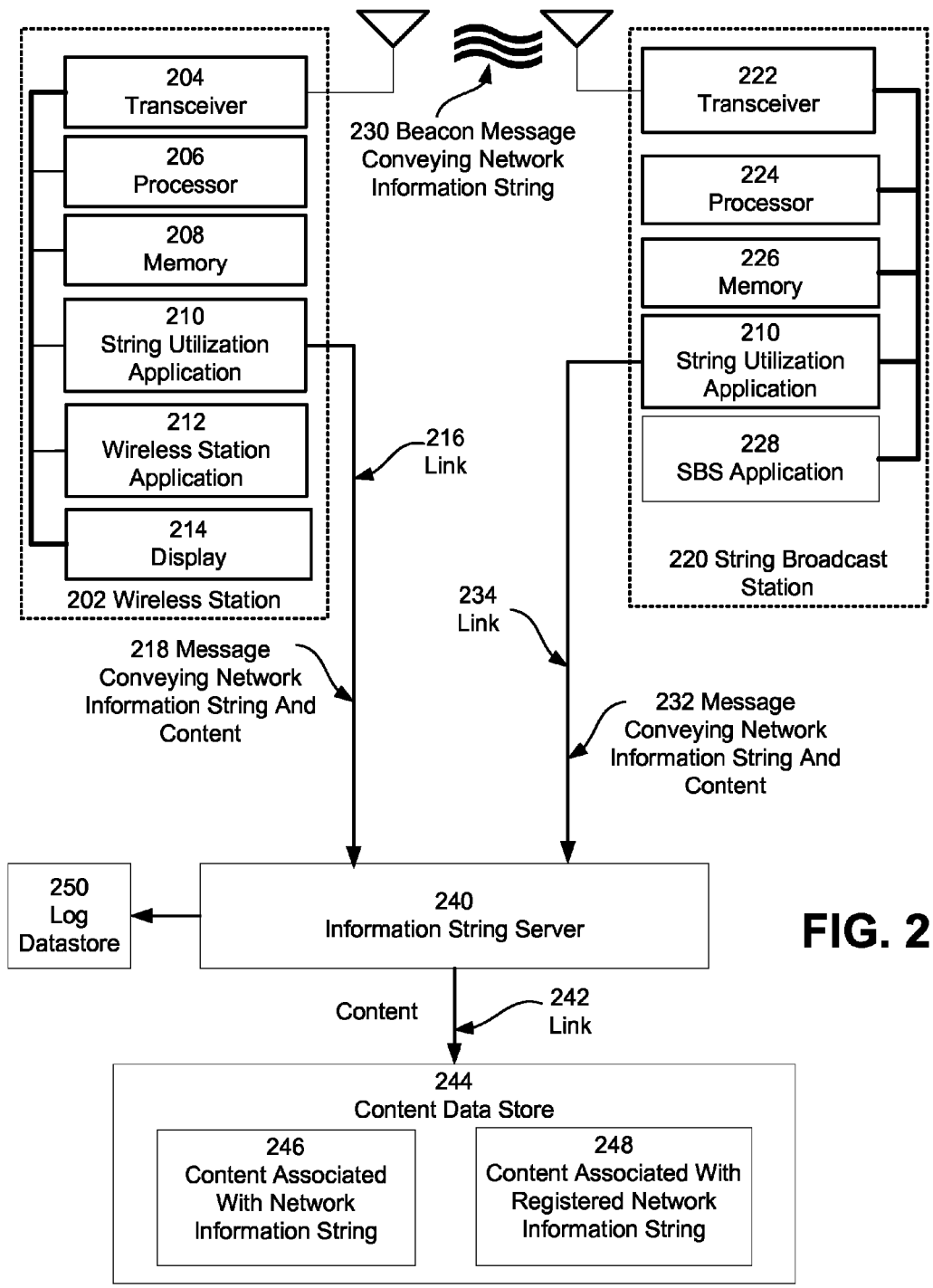
FIG. 2 is a flow diagram illustrating a process by which content associated with a network information string may be stored in a datastore according to an embodiment.

FIG. 2 is a flow diagram illustrating a process by which content associated with a network information string may be stored in a datastore according to an embodiment.

In an embodiment, content, or a link to content, may be stored in the record associated in a datastore in association with the network information string. Content may be stored by either the operator of the SBS and/or by a user of a wireless station. By way of illustration and not by way of limitation, the content may include coupons, announcements, menus, news alerts, messages, photos, directions or links to additional content on other servers.

A wireless station 202, such as for example and without limitation a Wi-Fi enabled device, comprises a transceiver 204, a processor 206, a memory 208, a wireless station application 212 and a display 214. The wireless station 202 also operates an instance of string utilization application 210. The wireless station application 212 provides instructions to the processor 206 of the wireless station 202 to enable the wireless station 202 to interact with the string broadcast station (SBS) 220, such as for example and without limitation a Wi-Fi string broadcast station, as is known in the art.

In an embodiment, an SBS 220 comprises a transceiver 222, a processor 224, a memory 226, and an SBS application 228. The SBS 220 also operates an instance of the string utilization application 210. The SBS application 228 provides instructions to the processor 224 of the SBS 220 to enable the SBS 220 to at least enable the SBS 220 to transmit beacon message 230.

In an embodiment, the SBS 220 broadcasts a beacon message 230 that includes a network information string. The network information string may be an SSID or a portion of an SSID as previously described.

Content may be delivered to, and stored in, a content datastore 244 by either the operator of the SBS 220 and/or the user of the wireless station 202. The content datastore 244 is illustrated as supporting two records. The record 246 allows content to be stored in association with a network information string without regard to the ownership of the registration of the network information string. Thus, the operator of the SBS 220 or the user of the wireless station 202 may submit content to the content datastore for association with a network information string and the content will be stored in the record 246. The record 248 is reserved for storage of content by a registered owner of a network information string.

In an embodiment, an operator of the SBS 220 may send a message 232 over a link 234 conveying content or a link to content and the network information string to the information string server 240. The information string server stores the content or the record 246 in the content datastore 244 associated with the network information string or in record 248 if the network information string has been registered by the operator of the SBS 220. The content may be associated with a network information string rule allowing delivery of the content during a particular time period. For example, a business may operate an SBS. The additional content scheduled for evening and night hours may indicate nightly specials, a message that the business is currently closed, or other time-sensitive information. During those specific time periods, potential customers may be directed to the business's website for more information.

In another embodiment, the additional content is stored in a record of the information string server 240 in association with the MAC address of an SBS. The MAC address may also be used in combination with the network information string or alone. The association of an SBS MAC address with a network information string allows the record 246 or the record 248 to store content that is specific to a particular SBS. When information is requested from the content data store 244, the MAC address may be included in the request. In this way, the content that is returned is specific to an SBS and the area that is served by that SBS. For example, a network information string may be used by the operator of a business that has multiple locations each with its own SBS. The operator may elect to issue a coupon for one location only. By tying the coupon to the MAC address of that specific SBS, the coupon will be served only when a request for content (described below) includes both the network information string and the correct MAC address.

In another embodiment, content is provided by a user of a wireless station, such as for example and without limitation a Wi-Fi enabled device. In this embodiment, a beacon message 230 is received at the wireless station 202 operating the string utilization application 210. By way of illustration and not by way of limitation, the wireless station 202 may be a cell phone, a smart phone, or a laptop computer. The string utilization application 210 may be utilized to receive or create content for association with the network information string broadcast by the SBS 210. The string utilization application 210 creates a message 216 conveying the content and the network information string, and optionally, the MAC address of the SBS 210 that transmitted the beacon message 230, to the information string server 240 via link 216. The content datastore 244 stores the content in association with the network information string in a record 246 that is associated with the network information string supplied in the message. When the SBS MAC address is included in the message 216, the content is stored in association with both the network information string and the MAC address. The MAC address may be used to establish a general location of the SBS 210, which location may be used in certain messages. For example, an operator of a wireless station may leave a message to gather at a location proximate to the location of the SBS 220 that broadcasts a particular network information string. As another example, the operator of a wireless station may also leave comments about a venue that is proximate to the location of the SBS 220 that broadcasts a particular network information string, such as feedback or a review of their products or services.

In an embodiment, the owner of the network information string has privileges that allow it to control the content in both record 246 and record 248. For example, the registered owner of a network information string may remove some or all of the content in record 246 that is associated with the registered network information string. A registered owner may also block the association of content to the registered network information string except by the registered owner.

As illustrated in FIG. 2, the content datastore 244 is physically separate from the information string server 240. In this configuration, the content data store 244 may be located on a server that is accessible to the information string server 240 via a link 242 and to the wireless station 202 via the link 216. In another embodiment, the content datastore 242 is a component of the information string server 240 and the content datastore 244 is served by the information string server 240 to the wireless station 202 via the communication link 216.

Requests to share content may be logged in the log datastore 250. The logged data may include identifying information of the wireless station 202, identifying information of the user of the wireless station 202, the network information string associated with the requested content, the time when the request for content was made and the location of the wireless station when the request for content was made. The logged data captured in log datastore 250 may be used to identify user preferences, determine the response of the user of the wireless station 202 to the content 234 associated with the network information string, and measure the interest of the user of the wireless station 202 in types of content.

In another embodiment, content is stored in a memory of a wireless station, such as, for example and without limitation, memory 208 of wireless station 202. By way of illustration and not by way of limitation, the content may be stored in memory 208 of the wireless station 202 at the direction of a user of the wireless station 202, by virtue of the configuration of string utilization application 210, or in response to the acquisition of content by the wireless station 202 from the content datastore 244 (acquisition of content from the content datastore 244 is discussed in detail below). For example, a user may configure a wireless station to play an audio file when in proximity to an SBS that is broadcasting a network information string that includes the word "coffee." The string utilization application 210 may also acquire content (for example, a coupon for a pastry) in response to receipt of a network information string from a first SBS that includes the word "coffee," wherein the coupon is presented when the wireless station receives a network information string (for example, "helen's cakes") from a second SBS.

Content Acquisition

Figure 3:
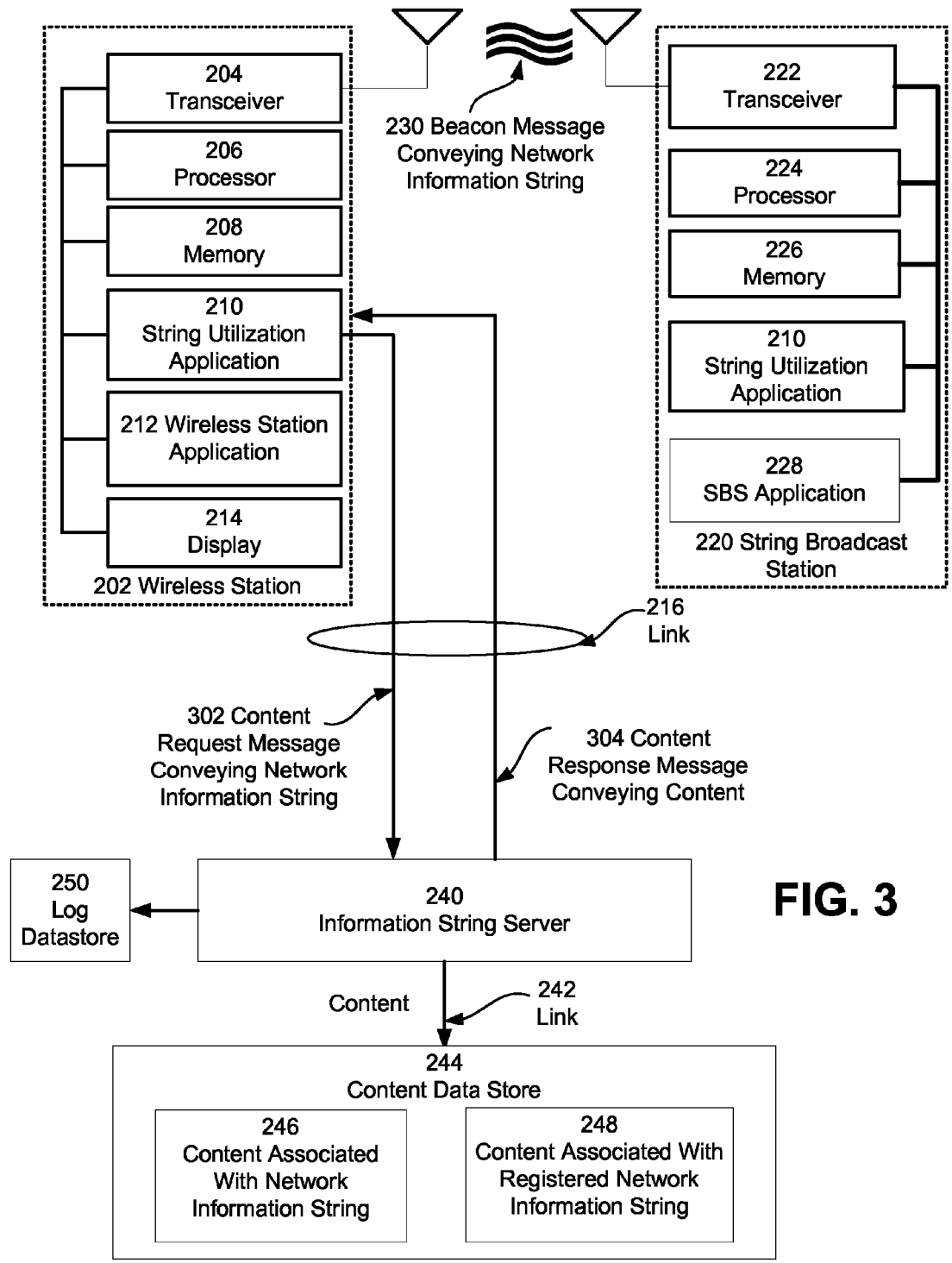
FIG. 3 is a block diagram illustrating the acquisition of content associated with a network information string according to an embodiment.

FIG. 3 is a block diagram illustrating the acquisition of content associated with a network information string according to an embodiment.

A wireless station 202, such as for example and without limitation a Wi-Fi enabled device, comprises a transceiver 204, a processor 206, a memory 208, a wireless station application 212 and a display 214. The wireless station 202 also operates an instance of string utilization application 210. The wireless station application 212 provides instructions to the processor 206 of the wireless station 202 to enable the wireless station 202 to interact with the SBS 220 as is known in the art.

In an embodiment, an SBS 220 comprises a transceiver 222, a processor 224, a memory 226, and SBS application 228. The SBS 220 also operates an instance of string utilization application 210. The SBS 228 provides instructions to the processor 224 of the SBS 220 to at least enable the SBS 220 to transmit beacon message 230.

In an embodiment, the SBS 220 broadcasts a beacon message 230 that includes a network information string that is associated with content stored on the information string server 240. The network information string may be associated with content stored in a record 246 or 248 held on content data store 244. The beacon message 230 may also include the MAC address of the SBS 220. In an embodiment, the SBS 220 provides wireless stations that associate with SBS 220 access to a network (not illustrated). In another embodiment, the SBS 220 is configured to broadcast beacon message 230 but is not configured to provide network access. In another embodiment, the SBS 220 not capable of providing connectivity to a network.

A wireless station 202 is configured with a string utilization application 210 to be executed by processor 206. By way of illustration and not by way of limitation, the wireless station 202 may be a cell phone, a smart phone, a laptop computer, a vending machine or a cash register.

The wireless station 202 may receive one or more beacon messages, including beacon message 230. In an embodiment, the string utilization application 210 examines the network identifier of each beacon message to determine if the network identifier contains a network information string included on a network information string list stored in a memory accessible to the wireless station 202, such as memory 208. When the string utilization application 210 receives a listed network information string, the string utilization application 210 may check a memory accessible to the wireless station 202, such as memory 208, for content that is associated with the network information string. If the content is not found in the memory accessible to the wireless station 202, the wireless station 202 may send a content request message 302 that includes the network information string to the information string server 240 via link 216.

Alternatively, the string utilization application 210 passes the network identifier from each beacon message to the information string server 240 for inspection without first examining the network information string. The information string server 240 examines the network identifier of each beacon message to determine if the network identifier contains a network information string associated with content stored in a data stored device accessible to information string server 240, such as content datastore 244.

As previously described, the network information string may include all or a portion of the network identifier (e.g., the SSID) that is broadcast by the string broadcast station 220. For example, a coffee shop chain may assign the SSIDs joesjava1, joesjava2 . . . joesjava[n] to its "n" shops. It may register the network information string "joesjava" to provide the same message to all of its patrons regardless of which shop a patron is visiting. It may also register joesjava[n] in association with string broadcast station MAC addresses to provide messages on a per-shop basis.

In another embodiment, the acquisition of content is based at least in part on the MAC address of the string broadcast station 220 that is included in the beacon message 230. In this embodiment, the MAC address may be associated with the network information string and with the content on the content datastore 244. The MAC address may be used to acquire content that is specific to a particular venue at which the SBS 220 is located.

The content request message 302 may also include credentials of the user of the wireless station 202. The credentials are evaluated by the information string server 240 prior to responding to a request to obtain content from the information string server. For example, the requestor may be required to first obtain a user ID and password from the information string server or from an authentication server utilized by the information string server. In an embodiment, the string utilization application 210 operating on the wireless station 202 may be configured to present the credentials required to access the information string server 240.

In another embodiment, the user of the wireless station 202 may establish a session of a fixed time period with the information string server 240 by presenting the required credentials to the information string server 240.

The information string server 240 responds by sending a content response message 304 to the wireless station 202 via the link 216. By way of illustration and not by way of limitation, the additional content may include coupons, announcements, menus, news alerts, photos, directions or links to additional content on other servers. As illustrated in FIG. 3, the content datastore 232 is physically separate from the information string server 240. In this configuration, the content datastore 244 may be located on a server that is accessible to the information string server 240 via a link 242 and to the wireless station 202 via the link 216. In another embodiment, the content datastore 244 is a component of the information string server 240 and the content is served by the information string server 240 to the wireless station 202 via the link 216.

The wireless station 202 communicates with the information string server 240 and receives content from the content datastore 232 via a communication link 216. The link 216 may be a wired link, a wireless link that is provided via a cellular network or a wireless link that is provided over a variety of wireless protocols. Alternatively, the link 216 may be provided wirelessly through a gateway (not illustrated) that connects a wireless network to a wired network such as the Internet. The wireless portion of the link may be provided through string broadcast station 220 or through another string broadcast station (not illustrated).

Requests for content may be logged in the log datastore 250. The logged data may include identifying information of the wireless station 202, identifying information of the user of the wireless station 202, the network information string associated with the requested content, the time when the request for content was made, and the location of the wireless station when the request for content was made. The logged data captured in log datastore 250 may be used to identify user preferences, determine the response of the user of the wireless station 202 to the content associated with the network information string, and measure the interest of the user of the wireless station 202 in types of content.

Embodiments hereof allow a message to be addressed to any wireless station that enters the range of a beacon signal sent by an SBS. Cell phones, smart phones, laptop computers, automated software, vending machines and cash registers can perform the functions using the system of the invention. The messages may convey marketing information, public service information, traffic information, instructions for persons with disabilities, sports scores, weather information, time schedules, and emergency instructions among other information. The messages may be displayed as text, images or audio or a combination of the same.

Listener Module

Figure 4:
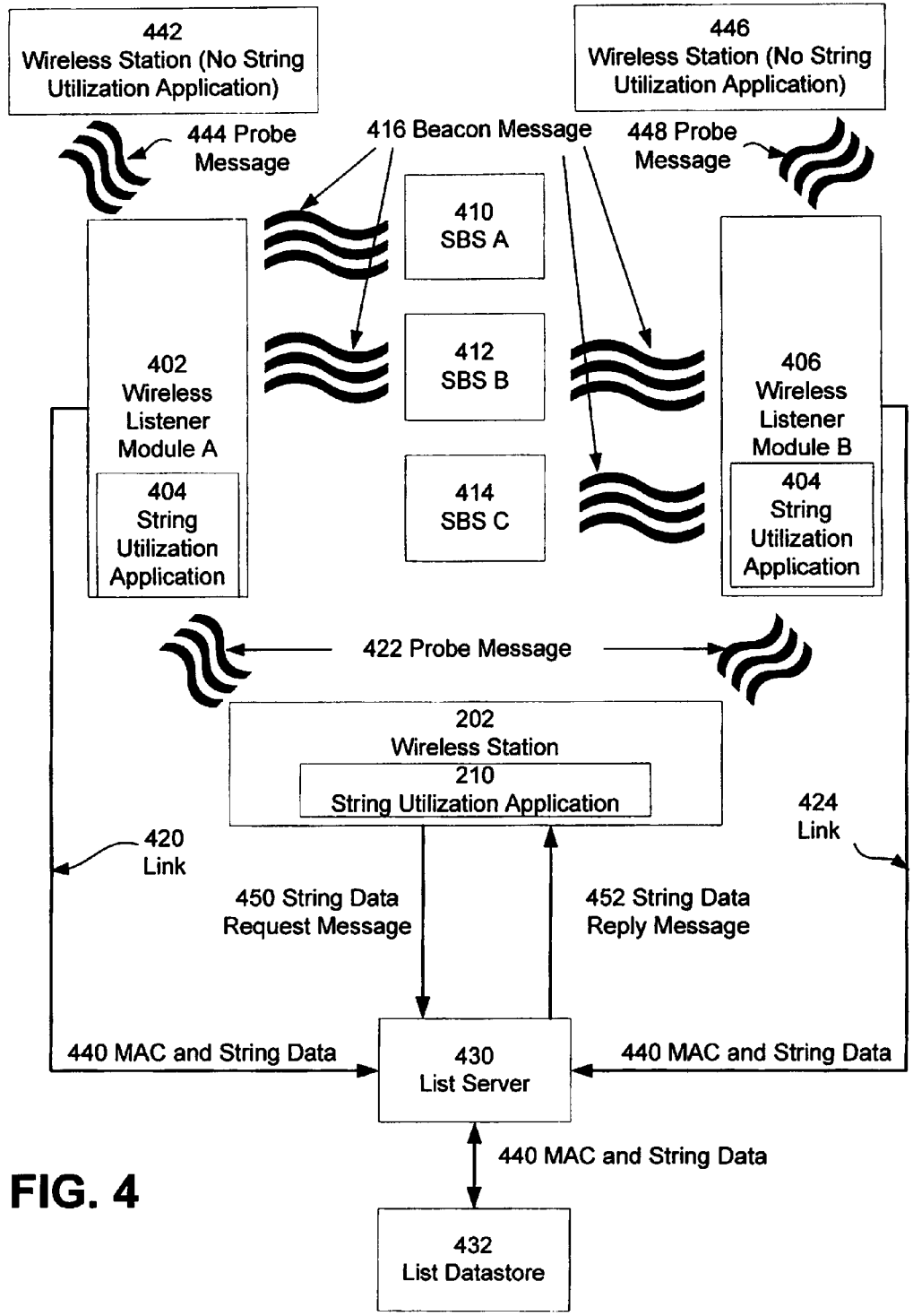
FIG. 4 is a flow block illustrating operations performed by a listener module according to an embodiment.

FIG. 4 is a block diagram illustrating operations performed by a listener module according to an embodiment.

Wireless listener module A and B (elements 402 and 406) are configured to listen for beacon messages 416 transmitted by string broadcast stations, such as SBS A, SBS B and SBS C (elements 410, 412 and 414). In an embodiment, an SBS beacon message 416 comprises a network information string. A wireless listener module (elements 402 and 406) operating a string utilization application (element 404) receives one or more beacon messages 416 and obtains the network information string from each received beacon message. The wireless listener modules (elements 402 and 406) also receive a probe message 422 from a wireless station 202. The probe message includes the media access controller (MAC) address of the wireless station 202. Wireless station 202 operates string utilization application 210. In another embodiment, wireless listener module 402 also receives probe message 444 from wireless station 442. The probe message 444 includes the media access controller (MAC) address of the wireless station 442. Wireless station 442 does not operate an instance of the string utilization application 210. Similarly, wireless listener module 404 also receives probe message 448 from wireless station 446. The probe message includes the MAC address of the wireless station 446. Wireless station 446 also does not operate an instance of the string utilization application 210. Thus, a wireless listener module receives probe and beacon messages from wireless stations and SBSs that are within range of the wireless listener module.

In an embodiment, a wireless listener module, such as module A and B, may also be configured to operate as an SBS and broadcast an SBS beacon message that comprises a network information string.

A wireless listener module, such as wireless listener module A, 402 associates the MAC address of the wireless station 202, the MAC address of wireless station 442, the MAC address of wireless station 444 and the MAC address of listener module A with the network information strings received from each beacon message 416 and sends the information strings and the MAC addresses to a list data server 430 for storage in a listener datastore 432. The wireless listener module A 402 may also provide a timestamp that indicates when the wireless station 202 was proximate to the listener module A 402.

As illustrated in FIG. 4, wireless listener module A 402 connects to the list data server 430 via a link 420 and wireless listener module B 406 connects to list data server 430 via link 422. The links 420 and 422 may be wireless links, such as via a wireless LAN or a wireless telephone network, or may be a wired link, such as via DSL line, a cable network, or a fiber network. In another embodiment, wireless listener modules A 402 and B 406 communicate with each other and other wireless listener modules via a mesh network (not illustrated).

Using an instance of the string utilization application 210, the wireless station 202 may send a string data request message 450 for a list of network information strings proximate to its current location from the list server that have been reported by one or more listener modules, such as wireless listener module A 402, that have also detected the probe message and the MAC address of the wireless station 202. The string data request message 450 includes the MAC address of the wireless station 202. The list server 440 may respond to the string data request message by acquiring a list of network information strings associated with the MAC address of the wireless station 202 from the listener datastore 432 and sending the list to the wireless station 202 in a string data response message.

In an embodiment, a wireless listener module, such as wireless listener module A 402, may listen for probe messages periodically. The time of receipt of a probe message 422 is captured by a time stamp. When a wireless station moves out of range of the wireless listener module A 402, the elapsed time between a current time and the time indicated by a last time stamp will increase. This elapsed time period may be used by the datastore 442 to measure the age of data relating to a MAC address and to log data (for example, MAC address and associated network information strings) to the listener datastore 432 or to delete data of a particular age.

While FIG. 4 illustrates two listener modules A and B, the illustration is not limiting. Any number of listener modules may be deployed in a physical space to form a listener network. Because the location of each listener module within the listener network is known, the location of a wireless station that broadcasts a probe message (without regard to whether the wireless station operates a string utilization application) may be tracked within the listener network. Time stamping of the receipt of probe messages by each listener module within the listener network allows the presence, path, time at location, number of visits to a location, and other metrics to be determined on a per wireless station basis. Additionally, the tracking data may be used to construct reports. For example, the tracking data may indicate that 3,000 wireless station passed by a particular listener module during a single day and that 78% of these also passed by the listener module the previous day. The tracking data may be of interest to city planners, businesses and public safety officials. For example, traffic outside a potential terrorist target could be monitored to determine if the behavior of a particular wireless station is suspicious.

FIG. 4 illustrates a list data server 430 and a listener datastore 432. In an embodiment, these structures are components of information string server 240 (see, FIG. 2).

Commanding Software Applications

Figure 5A:
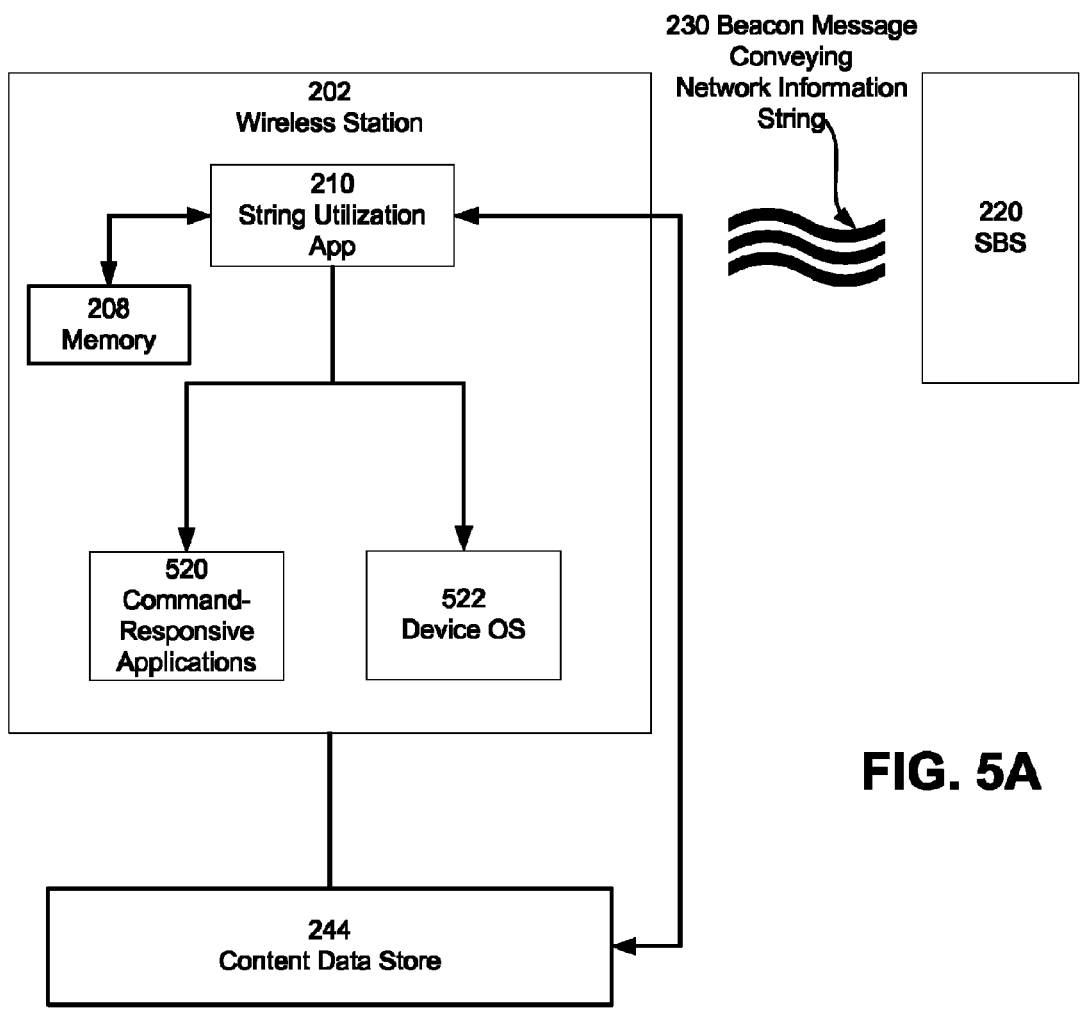
FIG. 5A is a block diagram illustrating the operation of a wireless station in response to receipt of a network information string according to an embodiment.

FIG. 5A is a block diagram illustrating the operation of a wireless station in response to receipt of a network information string according to an embodiment. (Note that FIG. 5A illustrates only a limited number of structural elements for the ease of discussion. See, FIGS. 2 and 3.) In an embodiment, a wireless station 202, such as, for example and without limitation a Wi-Fi enabled device, is configured with a string utilization application (string utilization application) 210 executed by processor 206 (not illustrated). By way of illustration and not by way of limitation, the wireless station 202 may be a cell phone, a smart phone, a laptop computer, a vending machine or a cash register.

The memory 208 and the content datastore 244 may include a list of network information strings that are associated with command codes, which list is accessible to string utilization application 210. The wireless station 202 may receive one or more beacon messages, including beacon message 230, from the string broadcast station 220. The string utilization application 210 examines the network identifier (for example and not as a limitation, an SSID) of each beacon message. In an embodiment, the string utilization application 210 may determine if the network identifier contains a network information string on the command code list stored in memory 208. Alternatively, the string utilization application 210 may forward a received network information string to information string server 240 (not illustrated). The string server 240 may respond with content that is stored in content datastore 244 that includes a command code.

When the string utilization application 210 receives a listed network information string associated with a command code that is stored in memory 208 or content datastore 244, the string utilization application 210 refers the listed command code to a command-responsive application 520 or to the operating system 522 of the wireless station. The command-responsive application 520 and the operating system 522 may be configured to take an action in response to the receipt of the command code. For example, the command-responsive application 520 may be a browser that is configured to open a particular web page in response to a particular command code. The device operating system 522 may be configured to load a command-responsive application 520 from memory or to download a command-responsive application from the Internet. Other actions may include displaying a reminder message or playing audio content.

Figure 5B:
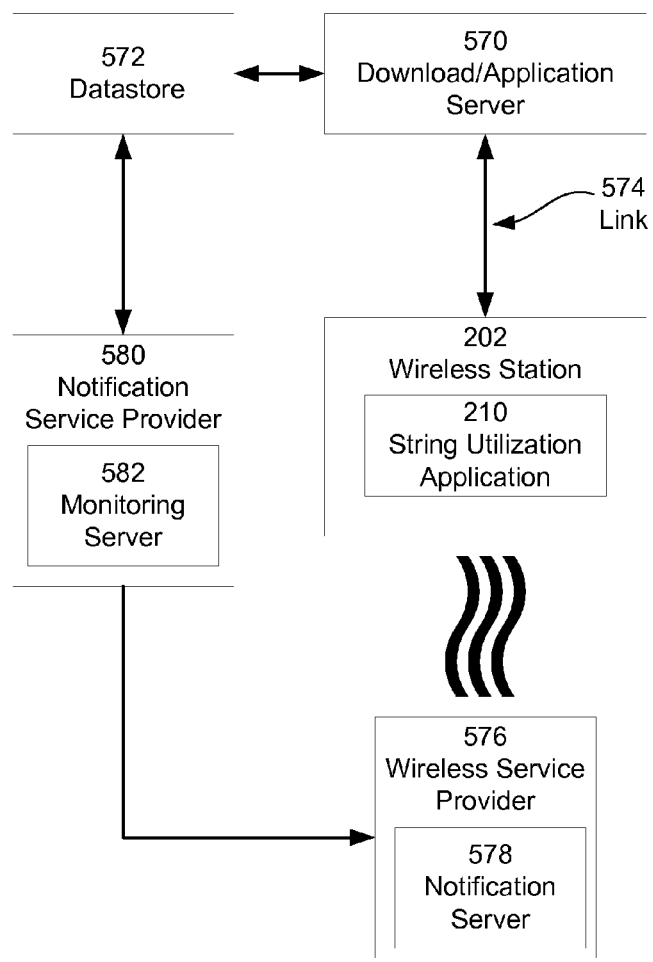
FIG. 5B is a block diagram illustrating a process for triggering a wireless station to take an action according to an embodiment.

FIG. 5B is a block diagram illustrating a process for triggering a wireless station to take an action according to an embodiment. In an embodiment, the string utilization application 210 is downloaded from a download/application server 570 to a wireless station 202 that receives wireless services from a wireless service provider 576. During the installation process, the download/application server 570 acquires wireless station information, including its MAC address and a unique token, and user information and stores the station and user information in a datastore 572. The wireless station 202 may be configured to receive a notification from the wireless service provider and to initiate a response based on this notification. In an embodiment, the string utilization application 210 is configured by a listener service provider 580 to respond to the receipt of the notification in a particular way.

In an embodiment, the notification service provider 580 monitors one or more wireless listener modules, such as wireless listener module A 402 as illustrated in FIG. 4, via a monitoring server 582. When the presence of the wireless station 202 is detected in proximity to a particular wireless listener module, the monitoring server 582 may send a message to the wireless service provider 576 to send a notification to the wireless station 202. The message from the monitoring server 582 to the wireless service provider 576 includes the unique token associated with the wireless station 202. The notification service provider 576 directs notification server 578 to send the notification to the wireless station 202, based on the unique token sent from the monitoring server. The receipt of the notification by the wireless station 202 conveys a location-relevant instruction to the string utilization application 210 operating on the wireless station 202. By way of illustration and not by way of limitation, the instruction may cause the wireless station 202 to download a coupon for a nearby merchant, render content, operate an application, connect to a website, etc.

Messaging Using Network Information Strings

Embodiments are directed to conveying information in a network identifier that may be received by wireless stations. The information may be unrelated to the operation of the wireless network.

Figure 6:
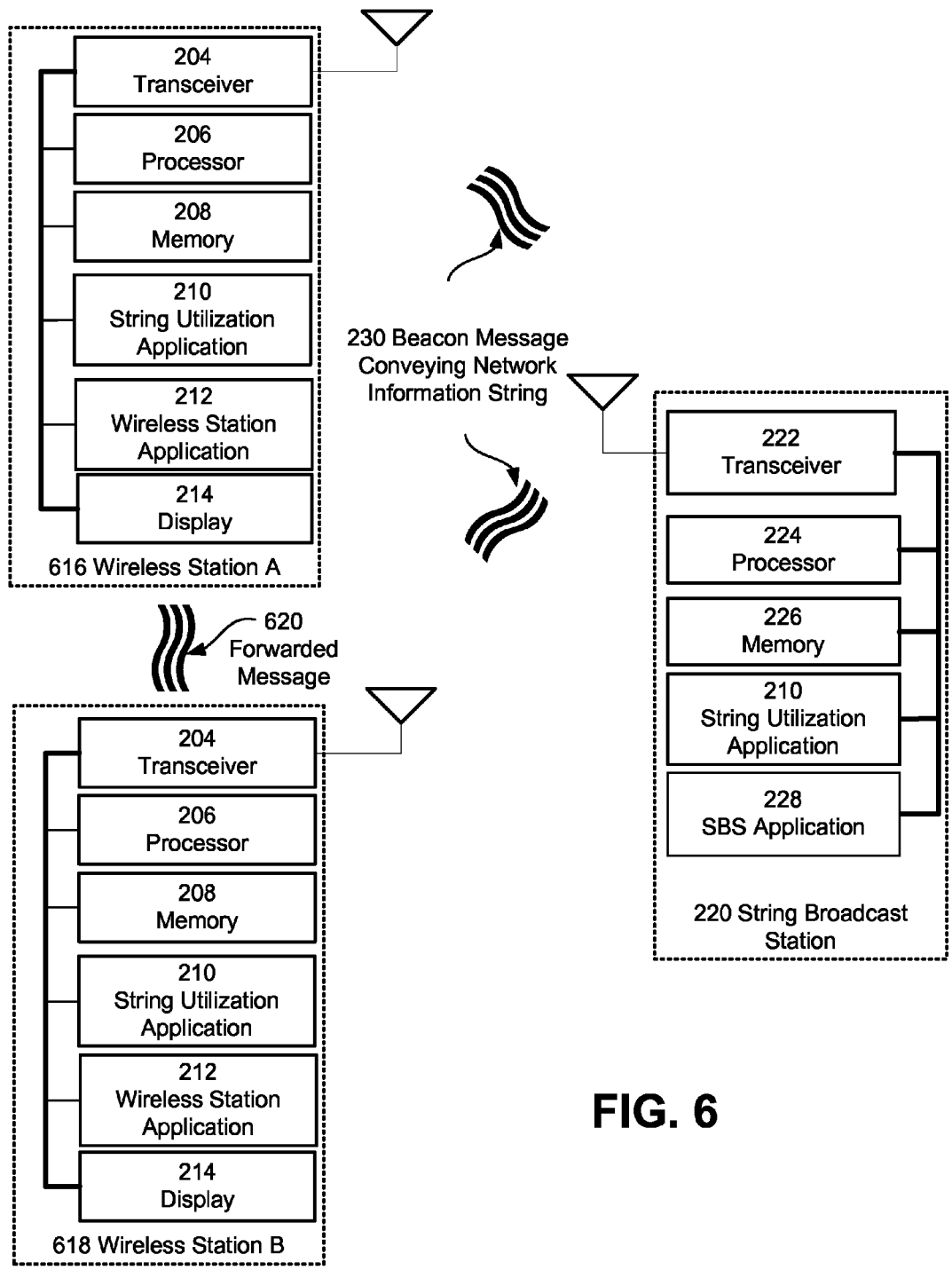
FIG. 6 is a block diagram illustrating a messaging system according to an embodiment.

FIG. 6 is a block diagram illustrating a messaging system according to an embodiment.

Figure 7:
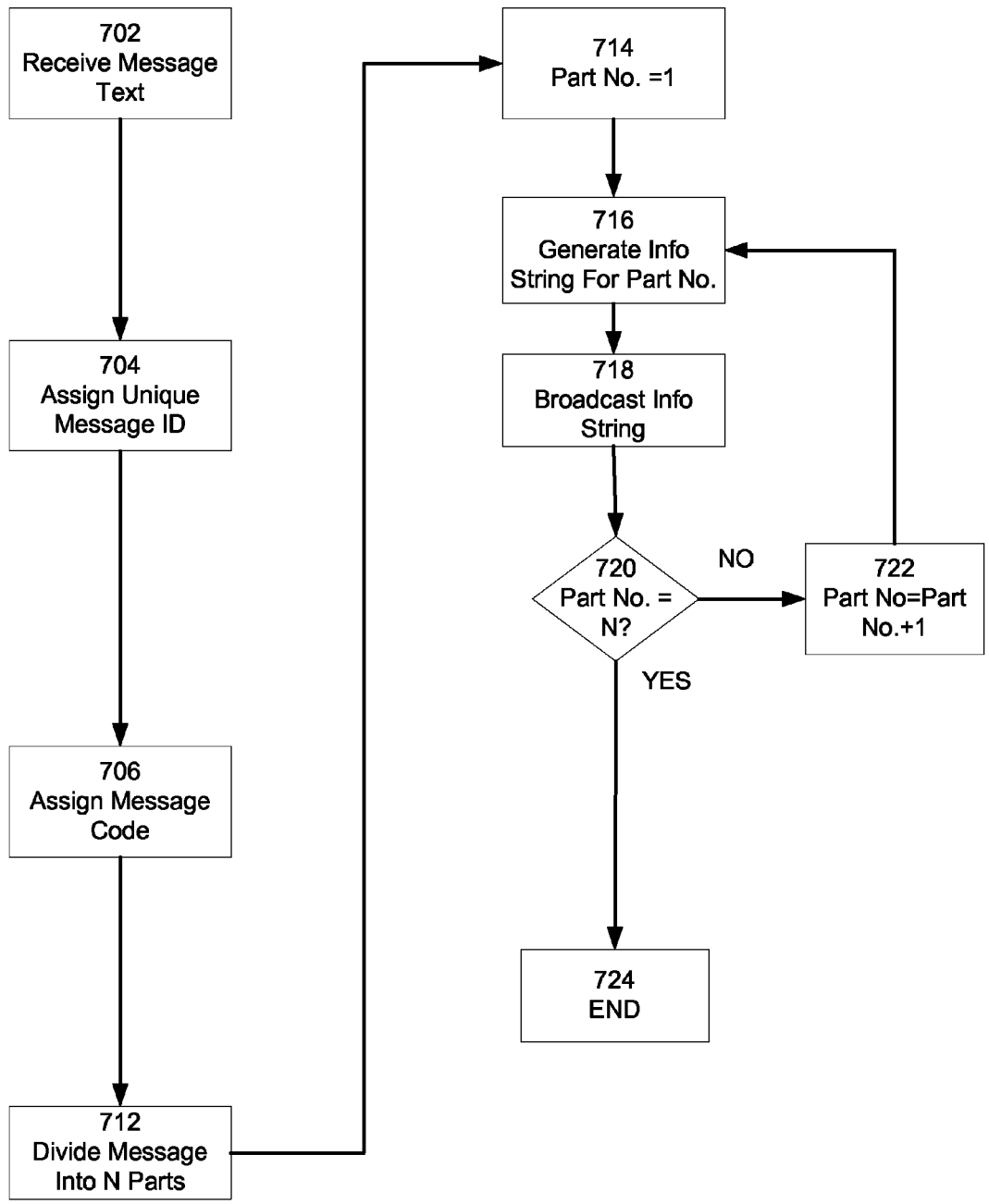
FIG. 7 is a flow diagram illustrating a process for conveying a message to a wireless station according to an embodiment.

FIG. 7 is a flow diagram illustrating a process for conveying a message to a wireless station according to an embodiment.

In an embodiment, an SBS 220 (as described in regards to FIGS. 2 and 3 above) operates a string utilization application 210. The string utilization application 210 receives text input from a user of the SBS 220 and generates a network information string that includes the text input as a text message. By way of illustration and not by way of limitation, the text input may be user settings, a message log, contact details, links to websites, links to email addresses, links to phone numbers, advertisements, coupons, and offers among others. The generated network information string may then be broadcast by the SBS 220 in the beacon message 230 using the SBS application 228.

A wireless station A 616 (as described in regards to FIGS. 2 and 3 above) also operates an instance of string utilization application 210. Using the wireless station application 212, the processor 206 and the transceiver 204, the wireless station A 616 receives the generated network information string from the SBS 220. The instance of the string utilization application 210 operating on the wireless station A 616 recognizes the network information string as encoded with a message (as further described below) and extracts the message from the network information string. The message may then be rendered on the display 214.

As illustrated in FIG. 6, a second wireless station B 618 also operates an instance of string utilization application 210. The wireless station B 618 also receives the generated network information string from the SBS 220. The instance of the string utilization application 210 operating on the wireless station B 618 extracts the message from the network information string. The message may then be displayed on the display 214 operating on wireless station B 618.

In an embodiment, the wireless station application 212 operating on wireless station A 616 may further enable the wireless station A 616 to operate as an SBS. In this embodiment, the instance of the string utilization application 210 operating on wireless station A 616 may be used to rebroadcast (or "forward") the generated network information string to the wireless station B 618. Thus, the wireless station B 618, which may be out of range of the SBS 220, may still receive the generated network information string. The instance of the string utilization application 210 operating on the wireless station B 618 may then extract the message from the forwarded network information string. The message may then be displayed on the display 214 operating on wireless station B 618.

As described above, the string utilization application 210 enables the SBS 220 to receive text from a user and to generate a network information string that incorporates the received text as a message. The string utilization application 210 also enables the wireless stations 616 and 618 to determine that a network information string includes text and to parse the network information string to obtain the message.

In an embodiment, a probe message from a wireless station is used to convey a message. In this embodiment, a wireless station A 616 is configured to operate in the absence of an SBS. The string utilization application 210 operating on the wireless station A 616 receives text input from a user of the wireless station A 616 and generates a network information string that includes the text input as a text message. By way of illustration and not by way of limitation, the text input may be user settings, a message log, contact details, links to websites, links to email addresses, links to phone numbers, advertisements, coupons, and offers among others. The generated network information string may then be broadcast by the wireless station 616 A in a probe message (not illustrated) using the wireless station application 212. The probe message may be received by another a wireless station, such as wireless station B 618, that is also configured to operate in the absence of an SBS. In this embodiment, a string broadcast station is not required. In this embodiment, among other functions and not by way of limitation, the embodiment may serve to facilitate such tasks as text messaging.

In an embodiment, the network information string that is generated by the string utilization application 210 operating on the SBS 220 conforms to a structure that is recognized by an instance of the string utilization application 210 operating on a wireless station A 616. Any message structure may be adapted for use with the string utilization application 210. The following structures and those shown in Tables 1, 2 and 3, are provided as an illustrative example of a messaging structure and are not meant to be limiting.

In an embodiment, messages may be identified by type as set forth in Table 1.

TABLE 1

MESSAGE TYPES

| Message Type | Code | Relay |
| --- | --- | --- |
| Message Local | L | N |
| Message Regional | R | Y |
| IM Here | I | N |
| Emergency Help | E | N |
| Deal Coupon | C | N |
| Menu | M | N |
| Shop Info | S | n |
| Non Radius network information strings | W | N |
| Gathering Details | D | Y |
| City Assist (streets/busses/etc.) | H | N |
| Sponsored Local Tour info | T | N |

In an embodiment, the string utilization application 210 will generate a network information string containing a text message using messaging formatting rules as set forth in Tables 2 and 3. The message formatting rules are also recognized by the instance of the string utilization application 210 running on a wireless station, such as wireless station A 616.

TABLE 2

| Format | Coding Meaning | Type |
| --- | --- | --- |
| MESSAGE Format: 123D1A > 24 more bytes . . . | 123 = Message ID | alphanumeric 0-Z (10 + 26 + 26 for each character) |
| | D = Message Type | L, R, I, E, C, M, S, W, D, etc. |
| | 1 = Message Part Code | parts 0-4, Z (signifying last part) (*36 possible) |
| | A = Message Relay Number | alphanumeric (26 + 10), 0-Z |
| | >Code End Marker | |

FIG. 7 is a flow diagram illustrating a process for conveying a message to a wireless station according to an embodiment.

A string utilization application 210 operating on an SBS, such as SBS 220 illustrated in FIG. 6, receives text from a user. (Block 702.) The string utilization application 210 causes the SBS to assign a unique message ID to the message. (Block 704.) In the embodiment illustrated in Table 2, the message ID is three bytes. However, this is not meant as a limitation. A message code is assigned to the message (as, for example, a code selected from Table 1). (Block 706.)

The message is divided into "N" parts or segments. (Block 712.) In an embodiment, a maximum number of message parts is established, such as six parts, and/or a maximum number of characters may be specified, such as 144 characters.

The part number is sent to "1." (Block 714). A network information string is generated for part number 1 (Block 716.) The generated network information string is broadcast by the SBS in a beacon message. (Block 718.)

A determination is made whether the last message part broadcasted by the SBS was message part "N." (Block 720). If the last message part broadcasted by the SBS was message part "N" (that is, the answer to Block 720 is "YES"), the process terminates. (Block 724.) If the last message broadcasted by the SBS is not message part "N" (that is, the answer to Block 720 is "NO"), the part number is incremented by "1" (Block 722) and the process returns to Block 716 where a network information string is generated for the next message part. The next message part is broadcast by the SBS in a beacon message. (Block 718.) The process again checks to determine whether the last message part broadcasted by the SBS was message part "N." (Block 720) The process continues until all "N" message parts have been sent.

The string utilization application 210 operating on the SBS may be configured to establish the number of times a message part is broadcast and the time between broadcasts.

In an embodiment, the string utilization application 210 operating on the wireless station 202 will continuously monitor all network information strings received by the wireless station to identify generated network information strings. A generated network information string with the same message ID (for example, the first three bytes of the generated network information string) will be identified as part of a single message. The string utilization application 210 uses the message part code to assemble the message parts in the proper order regardless of the order in which they are received. In an embodiment, a maximum number of message parts is established, such as six parts, and/or a maximum number of characters may be specified, such as 144 characters.

The string utilization application 210 will only display messages of the message types that match the message type settings in the application view settings. In an embodiment, a user of the string utilization application 210 may specify the types of messages that may be received by the string utilization application 210.

In an embodiment, a message format includes a message relay number character. When a message is received by the string utilization application 210 operating on wireless station 202 and the message type is Regional or Gathering, a properly configured wireless station may use the string utilization application 210 to relay or rebroadcast the message on to others. The string utilization application 210 maintains the same unique message coding for the message. However, the string utilization application 210 will increment the message relay number to the next increment before rebroadcasting it.

In an embodiment, the string utilization application 210 may limit the number of rebroadcasts to a predetermined number, such as 36. When the relay code reaches the predetermined number, the message will be displayed in the application, but not relayed.

In another embodiment, the string utilization application 210 is configured such that the wireless station will only display or relay any one message ID once regardless of the relay number. This prevents messages relaying back and forth between devices.

The string utilization application 210 operating on a receiving wireless station may be configured to establish the number of times a message part is re-broadcast and the time between re-broadcasts.

In an embodiment, the string utilization application 210 may be configured to allow a wireless station to be instructed by a user to forward a message as new. If the message is sent as new, the same message and message ID may be used so that other wireless stations operating the string utilization application 210 that have already processed the message may continue to ignore it. However, the "new" message will be sent with a message relay number of 1 thereby allowing the message to be relayed up to the predetermined number of relays and displayed on wireless stations that have not processed the message.

In an embodiment, the string utilization application 210 may be configured to allow the wireless station 202 to automatically forward messages that have not exceeded the predetermined number of relays. This function is intended to enable a local area to spread messages among a broad range of devices beyond the signal range of a single SBS. The string utilization application 210 may also be configured to turn off automatic forwarding.

In an embodiment, a message type "IM-HERE" has a unique message structure as set forth in Table 3.

TABLE 3

IM HERE FORMAT:
1: Intl Phone Number > Initial > 15 Characters Name . . .
2: Intl Phone Number > 123D1A > (Info Message Identifier)
3: 123I1Z > (Multipart message with entered IM Here info to share, always message code "I", always repeat code Z)

| | | |
|---|---|---|
| 1: 13 digit phone number | No relay, phone number is ID key | First Initial and last name (the phone number is unique, names may not be.) |
| 1: 1 Character Initial > Last Name | First Name initial and last name to go with the number | The number and name establish the IM Here listing |
| 2: Phone # > Unique message ID in standard format | Establishes this contact belongs to the following message ID | |
| 3: Standard message format with the MR ID indicated above | Standard message but "I" message type allows it only to be displayed in the IM Here form | 3: can contain any information the user entered into the IM Here setup form and displayed on this same form in the receiving application |

In this embodiment, the "IM-Here" message may include multiple parts and is non-relay only. The string utilization application 210 operating on a wireless station may be configured to display a first part of an IM-Here message and to permit viewing of other parts of the IM-Here message in response to user selection of an "additional details" function.

In an embodiment, the IM-Here message format uses a phone number in international form as a unique message identifier. In this embodiment, the phone number and a first initial and a last name of the sender are displayed on the wireless station when the IM-Here message is received by the string utilization application 210.

In another embodiment, the IM-Here message broadcasts the phone number, the first initial and last name of the user. This will be very useful in conferences, meetings, or any other events where the user would like to present a virtual, live business card to all in range of the SBS 220. By way of illustration and not by way of limitation, some phone service providers provide free phone numbers in most areas which permit the forwarding of text and calls to a selected phone. A user may set up IM-Here by entering a phone number and the name to be included in the IM-Here message. Optionally, the form as set up may also include optional fields for: LinkedIn, Facebook, email address, IM ID, URL1, URL2, etc. These data may be stored in a datastore.

The string utilization application 210 may be configured to broadcast an IM-Here formatted network information string message once every 30 seconds. When a wireless station receives an IM Here message, the wireless station will register with the datastore and store the message details so the user can see all IM-Here transmissions in the immediate area (in the meeting, conference, etc.).

The user of the wireless station may choose to send a normal phone text message to the user via the phone number in the IM-Here message (private message) or even call them directly. The user of the wireless station may also click on the LinkedIn or Facebook links (if the sender has included them). If the receiver has a Mobile Data connection, the user may go directly to LinkedIn/FaceBook/Email/etc.

In an embodiment, a string utilization application 210 is operated on a computing device, such as a laptop computer or tablet. For example, the string utilization application 210 is operated on a computing device at a registration desk for a meeting or conference. In this embodiment, the computing device collects IM-Here notifications from users of wireless stations as a form of automatic registration. The computing device may also be used to broadcast messages to registrants or may use the IM-Here information to send emails or text messages directly to certain registrants. Similarly, the IM-Here message structure may be used in other situations where broadcast as well as private messages are needed.

In an embodiment, the message code may affect the behavior on the wireless station that receives a particular message. By way of illustration and not by way of limitation, a message that is identified as an emergency message may be displayed immediately on the receiving wireless station. Additionally, a tone may be sounded or a vibration function of the wireless station activated to announce the receipt of an emergency message.

The string utilization application 210 may be configured to allow a wireless station to manage messages according to user preferences. For example, the wireless station may be configured to display messages when they are received or periodically. Messages may be grouped for display by message codes.

The string utilization application 210 may be configured to allow a user of a wireless station to set other optional settings, including logs, links to websites, automatic broadcasts, and other features.

Embodiments hereof may be used in any number of applications. By way of illustration and not by way of limitation, applications may include:
  sending regular updates from machines;
  sending notes from stores, offices, restaurants to communicate with people during emergency situations where electricity and internet are not available;
  assisting those with limited communication ability and enabling communication to those in the immediate area;
  assisting people calling for help and broadcast to only those in the immediate area and therefore most in a position to offer help;
  providing communication between passengers in separate cars or houses nearby.

In an embodiment, messages may be collected at certain points and moved onto the Internet, where they may be accessed or rebroadcasted in other locations. Additionally, messages may be logged at certain locations for access by others who return to that location using an internet connection.

Contributions to Countering Terrorism

As defined in 18 U.S.C. 2331, terrorism includes "activities that—(A) involve violent acts or acts dangerous to human life that are a violation of the criminal laws of the United States or of any State, or that would be a criminal violation if committed within the jurisdiction of the United States or of any State; [and] (B) appear to be intended—(i) to intimidate or coerce a civilian population; (ii) to influence the policy of a government by intimidation or coercion; or (iii) to affect the conduct of a government by assassination or kidnapping . . . ."

Embodiments herein materially contribute to countering terrorism by providing an efficient and cost effective tool to disseminate emergency information to individuals who may be directly affected by terrorist activity.

In an embodiment, a law enforcement agency registers a network information string with information string server 240. For example, an emergency information string may be in the form: "EMERGENCY—YOU MAY BE IN DANGER—FURTHER INFORMATION TO FOLLOW." In an embodiment, the information string server 240 may be configured to reserve network information strings that are indicative of a threat to public safety for registration by law enforcement agencies, government security agencies and other organizations that are responsible for protecting the public.

A law enforcement officer may operate a computing device, such as a smart phone, to send content for registration with the information string server 240 that includes an emergency alert message. The alert message is associated with a registered emergency information string. In an embodiment, the device that is used to communicate the emergency content message is verified as having been originated by an authorized source by requiring the presentation of credentials. The computing device of the law enforcement office may also notify the information string server 240 of network name identifiers received by the computing device from probe messages sent by wireless stations in proximity to the computing device. The information string server 240 may then push the alert message to the wireless stations identified by the computing device.

In another embodiment, the law enforcement officer may operate an SBS 220 that sends the emergency alert message as a structured message as described in reference to FIG. 7. The emergency alert message may then be forwarded by receiving network stations to other network stations as previously described. This may include communicating with the list server to confirm and communicate information about the message. Alternatively, receiving wireless stations may interpret and/or authenticate the received messages without requiring a connection to the string server. Using this functionality, receiving wireless stations may relay messages even when all cellular and internet connections are no longer active or are otherwise congested.

In other embodiments, the receipt of the registered emergency information string or the emergency alert message by the wireless station may trigger the wireless station to take an action. The action taken may depend on the content of the emergency information string or the emergency alert message. In these embodiments, the emergency information string or the emergency alert message may trigger the execution of an application running on the wireless station, which application determines the behavior of the wireless station.

For example, when the wireless station is a telephone handset, the receipt of the emergency alert message or the emergency information string may limit phone calls to a fixed duration or frequency (e.g., one minute duration or one call in a five minute interval). Text messages may be limited to certain destinations or throttled to a fixed number of text messages. These measures can immediately mitigate network congestion and allow emergency services to operate more effectively and maintain their ability to communicate to the public.

In yet another embodiment, the receipt of the emergency alert message or emergency information string by the wireless station may cause the wireless station to emit an emergency sound to alert the user of the emergency or give audio instructions to the user over the speakerphone.

In still another embodiment, the receipt of the emergency alert message or emergency information string by the wireless station may cause the wireless station to emit a high level audio signal, which may be ultrasonic, that may be use to locate victims of a terrorist attack or other emergency event. In another embodiment, an first emergency information string and/or message may be issued to warn of an attack or of an imminent event that poses a risk to public safety and a second (different) emergency information string and/or message may be issued after the occurrence of an event to help locate and/or assist victims of the event.

A third string and/or message may be issued to return wireless stations to normal operation.

In another embodiment, listener devices as described in reference to FIG. 4 may receive the registered network information string from the beacon message broadcast by the SBS 220 and operated by the law enforcement officer and the MAC addresses of wireless stations in proximity thereto. This information may be provided to a list server 430 and stored in list datastore 432. In an embodiment, in response to the emergency network information string, the list server 430 may be configured to push an emergency message to the wireless stations proximate to the SBS 220 operated by the law enforcement officer.

In another embodiment, the list server 430 also receives network information strings broadcast by other SBSs operated by other entities proximate to the SBS 220 operated by the law enforcement officer. In this embodiment, the network information strings broadcast by these other entities may be temporarily associated with the emergency alert message.

These and other embodiments materially contribute to countering terrorism by providing anti-terrorist agents a tool to disseminate localized information regarding an imminent or presently occurring terrorist attack to the public. The information may be used by the public in real time to avoid exposure to such an attack.

Figure 8:
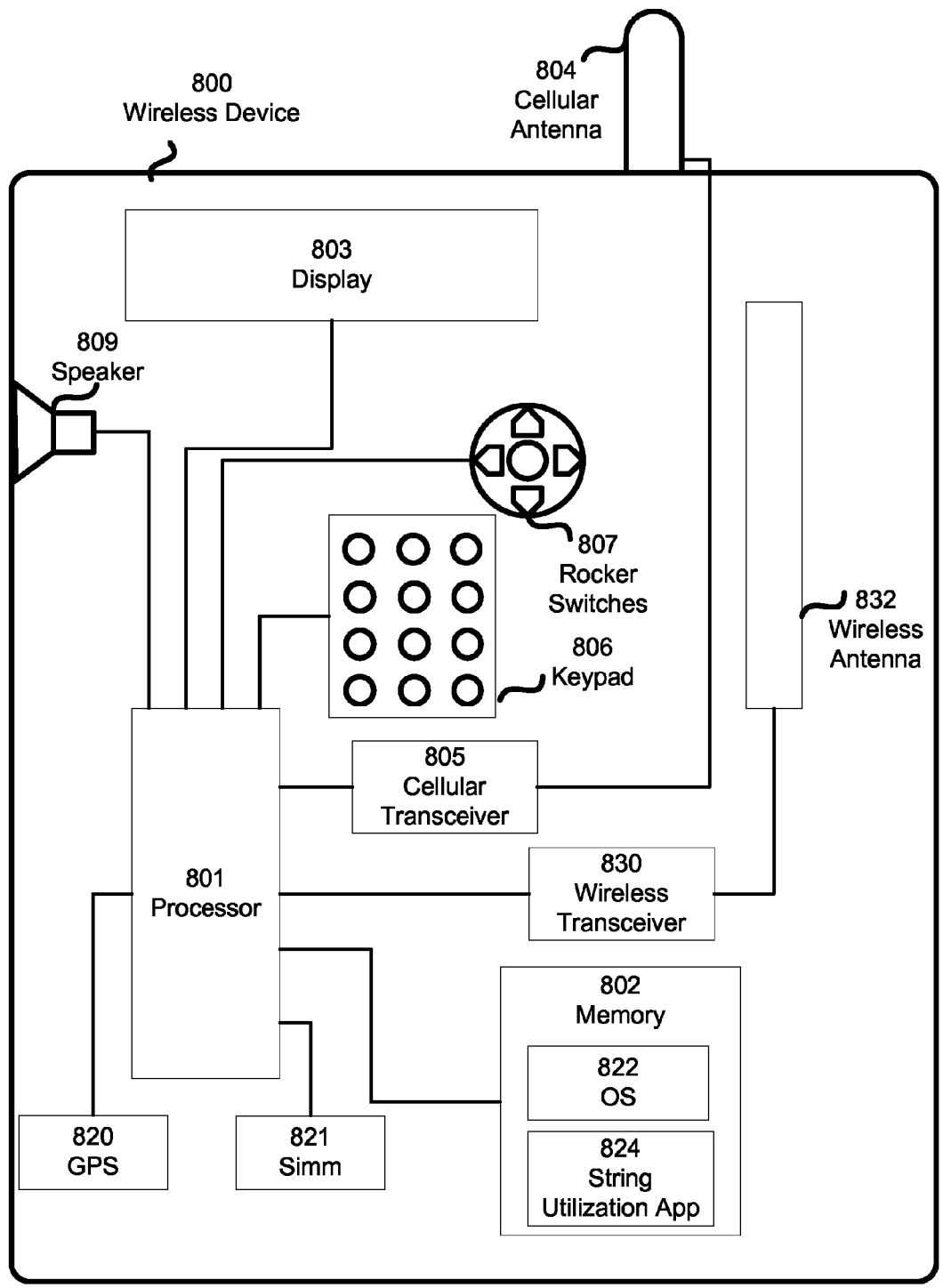
FIG. 8 is a block diagram illustrating components of a wireless station.

A wireless device suitable for use with the various embodiments is illustrated in FIG. 8.

A wireless device 800 may include a processor 801 coupled to an internal memory 802, to a display 803 and to a SIMM 821 or similar removable memory unit. Additionally, the wireless station 800 may optionally have a cellular antenna 804 for sending and receiving electromagnetic radiation that is connected to a cellular transceiver 805 coupled to the processor 801. In some implementations, the transceiver 805 and portions of the processor 801 and memory 802 may be used for multi-network communications. The wireless device 800 may also include a key pad 806 or miniature keyboard and menu selection buttons or rocker switches 807 for receiving user inputs. The wireless device 800 may also include a GPS navigation device 820 coupled to the processor and used to determine the location coordinates of the wireless device 800. Additionally, the display 803 may be a touch-sensitive device that may be configured to receive user inputs.

A wireless transceiver 830 provides wireless communications via wireless antenna 832. By way of illustration and not by way of limitation, the wireless transceiver may be compliant with 802.11x standards.

The processor 801 may be any programmable microprocessor, microcomputer or multiple processor chip or chips that can be configured by software instructions (applications) to perform a variety of functions, including the functions of the various embodiments described herein. In an embodiment, the wireless device 800 may include multiple processors 801, such as one processor dedicated to cellular and/or wireless communication functions and one processor dedicated to running other applications.

Typically, software applications may be stored in the internal memory 802 before they are accessed and loaded into the processor 801. For example, the internal memory 802 may include string utilization application 824. In an embodiment, the processor 801 may include or have access to an internal memory 802 sufficient to store the application software instructions. The memory may also include an operating system 822.

The internal memory of the processor may include a secure memory (not illustrated) which is not directly accessible by users or applications and that is capable of recording MDINs and SIMM IDs as described in the various embodiments. As part of the processor, such a secure memory may not be replaced or accessed without damaging or replacing the processor.

Additionally, the internal memory 802 may be a volatile or nonvolatile memory, such as flash memory, or a mixture of both. For the purposes of this description, a general reference to memory refers to all memory accessible by the processor 801, including internal memory 802, removable memory plugged into the computing device, and memory within the processor 801 itself, including the secure memory.

In an embodiment, additional memory chips (e.g., a Secure Data (SD) card) may be plugged into the wireless device 800 and coupled to the processor 801.

Figure 9:
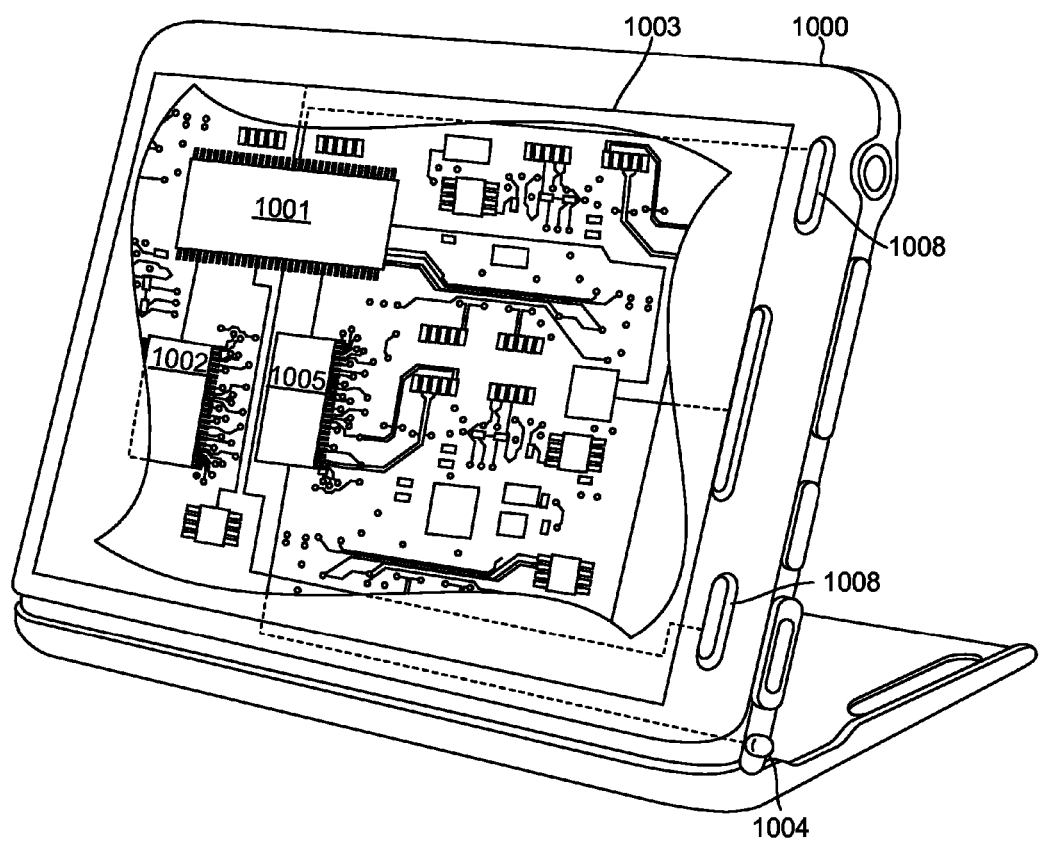
FIG. 9 is a block diagram illustrating a computing device.
Figure 10:
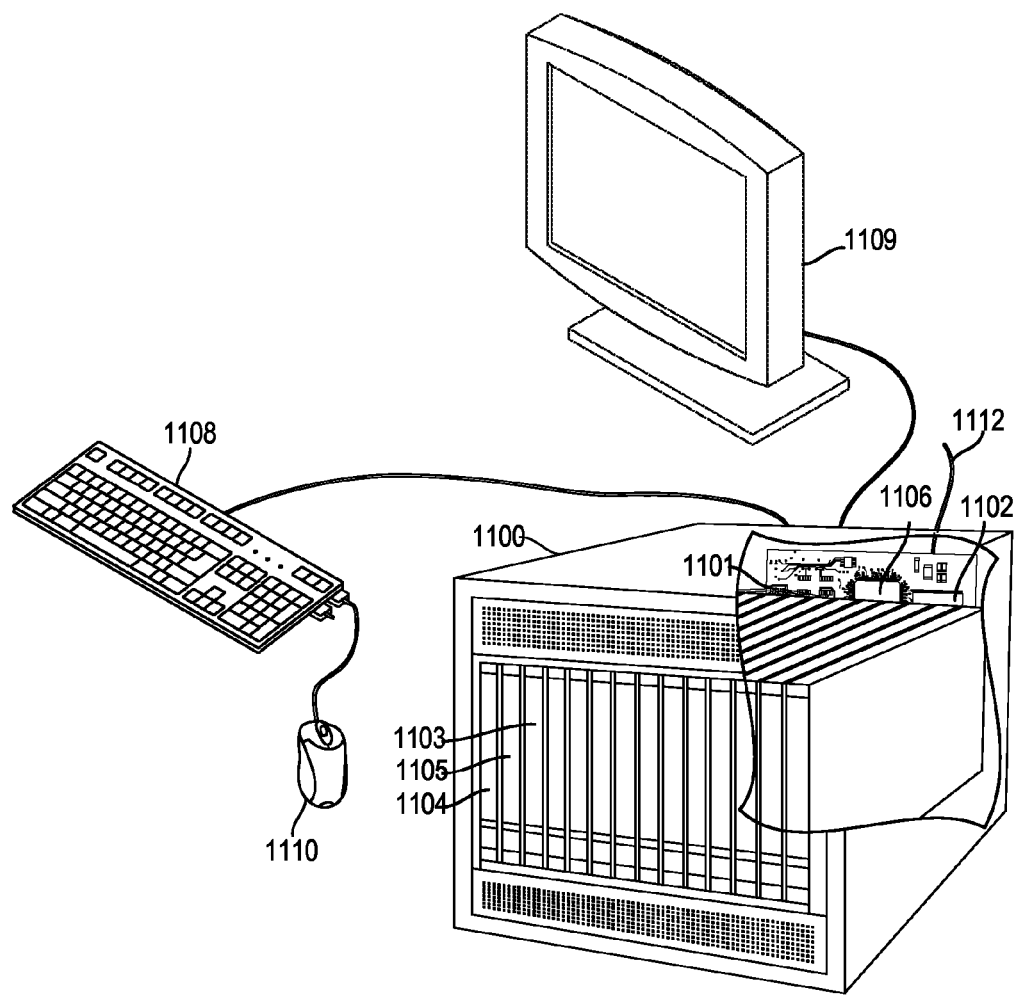
FIG. 10 is a block diagram illustrating a server device.

FIG. 9 is a system block diagram of a computing device suitable for use with various embodiments. A typical computing device 1000 may include a processor 1001 coupled to internal memory 1002, to a display 1003, and to a speaker 1008. Additionally, the computing device 1000 will include an antenna 1004 for sending and receiving electromagnetic radiation and/or data messages to and from the Internet and/or other networks. The various embodiments may also be implemented on any of a variety of commercially available server devices, such as the server 1100 illustrated in FIG. 10. Such a server 1100 typically includes a processor 1101 coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network 1112, such as a local area network coupled to other broadcast system computers and servers. Servers 1100 may also include operator interfaces, such as a keyboard 1108, pointer device (e.g., a computer mouse 1110), and a display 1109.

The processors 1001, 1101 may be any programmable microprocessor, microcomputer or multiple processor chip or chips that can be configured by software instructions (applications) to perform a variety of functions, including the functions of the various embodiments described below. In some mobile receiver devices, multiple processors may be provided, such as one processor dedicated to wireless communication functions and one processor dedicated to running other applications. Typically, software applications may be stored in the internal memory 1002, 1102, and 1103 before they are accessed and loaded into the processor 1001, 1101. The processor 1001, 1101 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD- ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for managing emergency communications over a wireless network comprising:
   receiving at an information string server device a request to associate an emergency alert message with a registered emergency information string, wherein the registered emergency information string is selected from the group consisting of at least a portion of a network name identifier and at least a portion of a media access control (MAC) address and wherein the request comprises authentication information;
   determining by the information string server device from the authentication information whether the request to associate the registered emergency alert message with the emergency information string is authorized; and
   storing by the information string server device the emergency alert message in association with the registered emergency information string in a record of an information string datastore when the request to store content is authorized.

2. The method of claim 1, wherein the authentication information is selected from the group consisting of a password, a personal identification number, a badge number, and a key.

3. The method of claim 1, wherein the network name identifier comprises at least a portion of a service set identifier.

4. The method of claim 1, wherein the emergency alert message comprises a text message and an audio message.

5. The method of claim 1 further comprising:
   broadcasting by a string broadcast station the registered emergency information string in a beacon message;
   receiving by a listener module the beacon message;
   receiving by the listener module probe messages broadcast by one or more wireless stations proximate to the listener module, wherein the listener module comprises a MAC address of the listener module and wherein a probe message comprises a MAC address of the wireless station from which the probe message originated; and
   sending by the listener module the MAC address of the listener module, the registered emergency information string and the MAC address of the one or more wireless stations to a list server device.

6. The method of claim 5 further comprising:
   requesting by one of the one or more wireless stations a list from the list server device of listed information strings associated with the MAC address of the requesting wireless station;
   determining by the one wireless station whether the list includes the registered emergency information string;
   requesting by the one wireless station the emergency alert message associated with the registered emergency information string when the list includes the registered emergency information string; and
   displaying by the one wireless station the emergency alert message.

7. The method of claim 1 further comprising:
   broadcasting by a string broadcast station the registered emergency information string in a beacon message;
   receiving by a wireless station the beacon message broadcast by the string broadcast station;
   obtaining by the wireless station the registered emergency information string from the beacon message;
   requesting by the wireless station the emergency alert message associated with the registered emergency information string from the storage device; and
   displaying by the wireless station the emergency alert message in response to the request.

8. The method of claim 7, wherein the wireless station is selected from the group consisting of a smartphone, a tablet, a laptop computer, a Wi-Fi enabled device, a Bluetooth enabled device, and a Zigbee enabled device.

9. The method of claim 7, wherein the wireless station and the string broadcast station communicate over a wireless network selected from the group consisting of a Wi-Fi network, an RFID network, a Zigbee network, a Bluetooth network and a 3G/4G cellular network.

10. The method of claim 7 further comprising taking by the wireless station one or more actions when the wireless station obtains the registered emergency information string from the beacon message.

11. The method of claim 10, wherein the one or more actions are selected from the group consisting of executing an application, playing by the wireless station an emergency audio signal, playing by the wireless station an audio message over a speakerphone, controlling by the wireless station a length or frequency of telephone calls, controlling by the wireless station the frequency or number of text messages, broadcasting an audible location signal, and broadcasting an ultrasonic location signal.

12. A system for managing emergency communications over a wireless network comprising:
   an information string server device comprising a first processor configured with software instructions to cause the information string server device to perform operations comprising:
      receiving a request to associate an emergency alert message with a registered emergency information string, wherein the registered emergency information string is selected from the group consisting of at least a portion of a network name identifier and at least a portion of a media access control address and wherein the request comprises authentication information;
      determining from the authentication information whether the request to associate the emergency alert message with the registered emergency information string is authorized; and
      storing the emergency alert message in association with the registered emergency information string in a first record of an information string datastore when the request to store content is authorized.

13. The system of claim 12, wherein the authentication information is selected from the group consisting of a password, a personal identification number, a badge number, and a key.

14. The system of claim 12, wherein the network name identifier comprises at least a portion of a service set identifier.

15. The system of claim 12, wherein the emergency alert message comprises a text message and an audio message.

16. The system of claim 12 further comprising:
   a listener module, wherein the listener module comprises a MAC address and a third processor configured with software instructions that cause the listener module to perform operations comprising:
      receiving a beacon message broadcast by the string broadcast station, wherein the beacon message includes the registered emergency information string;
      receiving probe messages broadcast by one or more wireless stations proximate to the listener module, wherein a probe message comprises a MAC address of the wireless station from which the probe message originated; and
      sending the MAC address of the listener module, the registered emergency information string and the MAC address of the one or more wireless stations to a list server device.

17. The system of claim 16 further comprising a wireless station comprising a second processor configured with software instructions that cause the wireless station to perform operations comprising:
   requesting a list from the list server device of listed information strings associated with the MAC address of the requesting wireless station;
   determining by the wireless station whether the list includes the registered emergency information string;
   requesting by the one wireless station the emergency alert message associated with the registered emergency information string when the list includes the registered emergency information string; and
   displaying by the one wireless station the emergency alert message.

18. The system of claim 12,
   wherein the first processor is further configured with software instructions to cause the information string server device to perform operations comprising broadcasting by a string broadcast station the registered emergency information string in a beacon message, and
   wherein the system further comprises a wireless station comprising a second processor configured with software instructions that cause the wireless station to perform operations comprising:
      receiving the beacon message broadcast by the string broadcast station;
      obtaining the registered emergency information string from the beacon message;
      requesting the emergency alert message associated with the registered emergency information string from the storage device; and
      displaying the emergency alert message in response to the request.

19. The system of claim 18, wherein the wireless station is selected from the group consisting of a smartphone, a tablet, a laptop computer a Wi-Fi enabled device, a Bluetooth enabled device, and a Zigbee enabled device.

20. The system of claim 18, wherein the wireless station and the string broadcast station communicate over a wireless network selected from the group consisting of a Wi-Fi network, an RFID network, a Zigbee network, a Bluetooth network and a 3G/4G cellular network.

21. The system of claim 18, wherein the second processor is further configured with software instructions that cause the wireless station to perform operations comprising taking one or more actions when the wireless station obtains the registered emergency information string from the beacon message.

22. The system of claim 21, wherein the one or more actions are selected from the group consisting of executing an application, playing by the wireless station an emergency audio signal, playing by the wireless station an audio message over a speakerphone, controlling by the wireless station a length or frequency of telephone calls, controlling by the wireless station the frequency or number of text messages, broadcasting an audible location signal, and broadcasting an ultrasonic location signal.

* * * * *